US012654431B2

(12) United States Patent
Onuma

(10) Patent No.: US 12,654,431 B2
(45) Date of Patent: Jun. 16, 2026

(54) PACKAGING MATERIAL FOR TOBACCO PRODUCTS AND PACKAGE FOR TOBACCO PRODUCTS

(71) Applicant: Japan Tobacco Inc., Tokyo (JP)

(72) Inventor: Yuta Onuma, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 18/793,060

(22) Filed: Aug. 2, 2024

(65) Prior Publication Data

US 2024/0391227 A1     Nov. 28, 2024

Related U.S. Application Data

(63) Continuation of application No. PCT/JP2022/004400, filed on Feb. 4, 2022.

(51) Int. Cl.
| | |
|---|---|
| *B32B 29/00* | (2006.01) |
| *B32B 27/10* | (2006.01) |
| *B32B 27/32* | (2006.01) |
| *B65D 85/08* | (2006.01) |

(52) U.S. Cl.
CPC ............ *B32B 29/005* (2013.01); *B32B 27/10* (2013.01); *B32B 27/32* (2013.01); *B65D 85/08* (2013.01); *B32B 2255/12* (2013.01); *B32B 2255/26* (2013.01); *B32B 2307/718* (2013.01); *B32B 2439/40* (2013.01)

(58) Field of Classification Search
CPC ....... B32B 29/005; B32B 27/10; B32B 27/32; B32B 2255/12; B32B 2255/26; B32B 2307/718; B32B 2439/40; B65D 85/08

USPC .......... 206/265, 245; 229/87.13, 87.18, 909; 53/444
See application file for complete search history.

(56) References Cited

U.S. PATENT DOCUMENTS

| | | | |
|---|---|---|---|
| 8,579,108 B2 * | 11/2013 | Tanbo | B65D 77/02 |
| | | | 229/87.13 |
| 2006/0168909 A1 | 8/2006 | Miyaoka et al. | |
| 2019/0276223 A1 * | 9/2019 | Bellamah | B65D 85/10568 |
| 2022/0033158 A1 * | 2/2022 | Boswell | B32B 7/12 |

FOREIGN PATENT DOCUMENTS

| | | | |
|---|---|---|---|
| CN | 103981763 A | | 8/2014 |
| JP | S60-048344 A | | 3/1985 |
| JP | 2004-106369 A | | 4/2004 |
| JP | 2004106369 | * | 4/2004 |
| JP | 2010-241504 A | | 10/2010 |
| JP | 6048344 B2 | * | 12/2016 |
| WO | 2005/007512 A1 | | 1/2005 |

OTHER PUBLICATIONS

International Search Report and Written Opinion mailed on Apr. 5, 2022, received for PCT Application PCT/JP2022/004400, filed on Feb. 4, 2022, 11 pages including English Translation.

* cited by examiner

*Primary Examiner* — Rafael A Ortiz
(74) *Attorney, Agent, or Firm* — XSENSUS LLP

(57) ABSTRACT

A sheet-like packaging material for packaging tobacco products, said packaging material comprising at least a first paper layer including an aromatized component, a barrier layer having barrier properties against the aromatized component, and a second paper layer, wherein the barrier layer is disposed so as to be positioned between the first paper layer and the second paper layer.

20 Claims, 11 Drawing Sheets

UP

LEFT     BACK

FRONT     RIGHT

DOWN

PACKAGING MATERIAL FOR TOBACCO PRODUCTS AND PACKAGE FOR TOBACCO PRODUCTS

CROSS-REFERENCE TO RELATED APPLICATION

The present invention contains subject matter related to PCT International Application No. PCT/JP2022/004400, filed on Feb. 4, 2022, the entire contents of which are incorporated herein by reference.

TECHNICAL FIELD

The present invention relates to a tobacco product packaging material and a tobacco product package.

BACKGROUND ART

There are various packaging materials for packaging tobacco products. Typical known examples of the packaging materials include hard packages and soft packages in which a predetermined number of (for example, about 20) tobacco articles are bundled together and packaged.

For example, a widely known form of the hard package is a hinged-lid package including an outer box and a lid connected to the outer box in an openable-closable manner by a hinge. In general, tobacco products accommodated in the outer box are wrapped in an inner pack formed of a folded soft sheet material and then accommodated in the outer box. The soft package is typically formed by wrapping tobacco products in an inner pack formed by folding an inner wrapping sheet and then wrapping the inner pack with a soft external wrapping sheet.

Moreover, in recent years, in order to impart aromas other than the original flavor and taste of tobacco and to further strengthen the original flavor and taste of tobacco, there has been increasing use of packaging materials that contain a flavoring component on a surface serving as an inside surface when assembled. In general, in such a packaging material containing a flavoring component, a layer formed of a metal foil, such as an aluminum foil, is provided on a side opposite to the surface containing the flavoring component to prevent the flavoring component from leaking from the inside surface to the outside surface.

For example, Patent Document 1 discloses a packaging material formed of a metal foil or metallized paper having a region scented with an aromatic substance, and Patent Document 2 discloses a packaging material produced by laminating a paper layer containing menthol as an aromatic substance and a metal foil.

CITATION LIST

Patent Documents

Patent Document 1: Japanese Unexamined Patent Application Publication No. 2010-241504
Patent Document 2: International Publication No. 2005/007512

SUMMARY OF INVENTION

Technical Problem

As described above, in the existing tobacco product packaging materials containing a flavoring component, in order to prevent the flavoring component from leaking to the outside, a metal foil such as an aluminum foil has been used as a layer located outside the layer containing the flavoring component when assembled. While a metal foil has excellent barrier properties for preventing the leakage described above, the metal foil is expensive to produce and thus undesirable in view of the current circumstances that require sustainable products. Simply removing the metal foil may cause not only the problem of leakage, but also the problem of deterioration in appearance due to leakage. To solve these problems, there is still room for improvement in the development of packaging materials from the viewpoint of improving the configuration.

In view of the above, an object of the present invention is to provide a tobacco product packaging material capable of reducing leakage of a flavoring component contained in a paper layer to the outside and deterioration in appearance and a tobacco product package formed using the tobacco product packaging material.

Solution to Problem

As a result of extensive studies, the inventors of the present invention have found that the above object can be achieved by a configuration at least including a first paper layer containing a flavoring component, a barrier layer having barrier properties against the flavoring component, and a second paper layer and conceived the present invention.

[1] A tobacco product packaging material, the packaging material being a sheet-packaging material for packaging a tobacco product, the packaging material at least including:

a first paper layer containing a flavoring component, a barrier layer having barrier properties against the flavoring component, and a second paper layer.

wherein the barrier layer is disposed so as to be positioned between the first paper layer and the second paper layer.

[2] The tobacco product packaging material according to [1], further including a coat layer serving as an outermost layer on a side where the second paper layer is located when viewed from the barrier layer.

[3] The tobacco product packaging material according to [1] or [2], wherein the flavoring component contains menthol.

[4] The tobacco product packaging material according to any one of [1] to [3], wherein the barrier layer satisfies (Condition 1) below.

(Condition 1) Operations (1) to (4) below using the barrier layer are performed five times, and permeation of ethanol is not visually observed in any of resulting five specimens.

(1) A specimen in which the barrier layer is disposed on a substrate is prepared.

(2) The specimen is placed on a flat surface such that the barrier layer faces upward.

(3) Three drops of ethanol (purity: 99.5% or more) are dropped from a height of 25 mm onto the barrier layer with a pipette.

(4) Ten minutes later, the ethanol adhering to the barrier layer is wiped off with tissue paper.

[5] The tobacco product packaging material according to any one of [1] to [4], wherein (Condition 2) below is satisfied.

(Condition 2) A flavor is applied to the first paper layer such that a basis weight is 10 gsm, and at a time of holding for 14 days, permeation of the flavor is not visually observed on the second paper layer.

[6] The tobacco product packaging material according to any one of [1] to [5], wherein the tobacco product packaging material includes no metal layer.

[7] A tobacco product package formed using a tobacco product packaging material, wherein the tobacco product packaging material is the tobacco product packaging material according to any one of [1] to [6], and the tobacco product package includes a tobacco product accommodated in an internal container formed using the tobacco product packaging material such that the first paper layer is positioned inside.

Advantageous Effects of Invention

The present invention can provide a tobacco product packaging material capable of reducing leakage of a flavoring component contained in a paper layer to the outside and reducing deterioration in appearance and a tobacco product package formed using the tobacco product packaging material.

DESCRIPTION OF EMBODIMENTS

Embodiments of the present invention will be described in detail below. However, the following descriptions are merely examples (representative examples) of the embodiments of the present invention, and the present invention is not limited to these descriptions without departing from the spirit of the present invention.

In this description, a numerical range expressed using "to" means a range including numerical values before and after "to" as a lower limit value and an upper limit values, respectively, and "A to B" means A or more and B or less.

In this description, a plurality of embodiments will be described, and various conditions in each embodiment can apply to other embodiments in applicable ranges.

Embodiments of the tobacco product packaging material and package according to the present invention will be described with reference to the drawings. The dimensions, materials, shapes, relative arrangements, and the like of structural elements described in the embodiments are merely examples.

<Configuration of Tobacco Product Packaging Material>

A tobacco product packaging material according to an embodiment of the present invention (hereinafter, also simply referred to as a "tobacco product packaging material" or "packaging material") is a sheet-packaging material for packaging a tobacco product, the packaging material at least including:

a first paper layer containing a flavoring component, a barrier layer having barrier properties against the flavoring component, and a second paper layer.

in which the barrier layer is disposed so as to be positioned between the first paper layer and the second paper layer.

Figure 1:
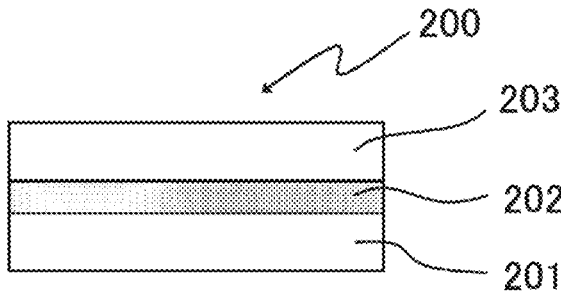
FIG. 1 is a view illustrating a layer structure of a tobacco product packaging material according to an embodiment of the present invention.

FIG. 1 illustrates an example of the tobacco product packaging material according to an embodiment. The tobacco product packaging material will be described below with reference to FIG. 1. In this description, each drawing illustrating a layer structure of a packaging material schematically illustrates respective layers constituting the layer structure of the packaging material.

A tobacco product packaging material 200 illustrated in FIG. 1 is constituted by a three-layer structure that includes a first paper layer 201 containing a flavoring component, a barrier layer 202 having barrier properties against the flavoring component, and a second paper layer 203, in which the barrier layer 202 is disposed so as to be positioned between the first paper layer 201 and the second paper layer 203.

A flavoring material contained in a paper layer causes deterioration in appearance due to leakage. In particular, in an exemplary embodiment in which a crystalline substance such as menthol is contained in the flavoring material, in the case of the storage in an environment at a low atmospheric temperature such as in the winter season, the crystalline substance such as menthol leaked on the surface is crystallized, and the crystallized substance is seen by the user, which may cause deterioration in appearance that looks like dirt.

The tobacco product packaging material 200 according to this embodiment includes the barrier layer 202 between the first paper layer 201 and the second paper layer 203, and the flavoring component contained in the first paper layer 201 does not reach the second paper layer 203; therefore, the problem of leakage does not occur in the second paper layer 203. If the flavoring component contained in the first paper layer 201 is unevenly present at the interface between the first paper layer 201 and the barrier layer 202 or is unevenly present in the first paper layer 201, in the case of a barrier layer 202 having translucency, the appearance when viewed from the barrier layer 202 side deteriorates. However, the above tobacco product packaging material 200 includes the second paper layer 203 that is located opposite the first paper layer 201 with the barrier layer 202 interposed therebetween, and thus the problem of the deterioration in appearance can be reduced.

The tobacco product packaging material 200 may have any sheet-shape. The shape in the planar direction may be, for example, a polygonal shape, a circular shape, an elliptical shape, or a shape intended for the assembly of a package (for example, the shape in FIG. 6, which will be described later in the description of a tobacco product package) and is preferably a polygonal shape, more preferably a quadrangular shape from the viewpoint of the ease of production and the ease of assembly of the package.

The basis weight of the tobacco product packaging material 200 is not particularly limited but is preferably 30 gsm or more, more preferably 40 gsm or more, and preferably 200 gsm or less, more preferably 150 gsm or less, still more preferably 100 gsm or less from the viewpoint of machine suitability. The basis weight in this description is calculated on the basis of the dry weight of the target substance unless otherwise specified. In particular, the basis weight of a substance formed through a process of, for example, application of a liquid is calculated on the basis of the dry weight after solidification by a process such as solvent removal. The basis weight of a substance formed through a process of, for example, melting is calculated on the basis of the dry weight after solidification by a process such as cooling solidification.

The area of the tobacco product packaging material 200 is not particularly limited, can be appropriately set according to tobacco products to be accommodated, and may be, for example, 20 cm$^2$ or more, 45 cm$^2$ or more, 80 cm$^2$ or more, 125 cm$^2$ or more, and 1,000 cm$^2$ or less. 500 cm$^2$ or less, and less than 20 cm$^2$, and more than 1,000 cm$^2$.

[First Paper Layer]

An exemplary embodiment of the first paper layer 201 is not particularly limited, publicly known paper can be used, for example. Western paper can be used, and specifically, printing paper, wrapping paper, thin paper, or the like can be used. From the viewpoints that bending of the packaging material 200 when the packaging material 200 is folded around the tobacco products is facilitated and the production process is simplified, and that the first paper layer 201 can be more easily decomposed, and therefore, a package that is more environmentally conscious can be provided, the content of a fibrous cellulose-based material is typically 30% by weight or more, preferably 50% by weight or more, more preferably 70% by weight or more. There is no need to set the upper limit, and the content of the fibrous cellulose-based material may be 100% by weight and may be 100% by weight or less.

The basis weight of the first paper layer 201 is not particularly limited, but from the viewpoint of machine suitability, it is 25 gsm or more, preferably 35 gsm or more, more preferably 40 gsm or more, and is less than 65 gsm, preferably less than 60 gsm, more preferably less than 55 gsm. In general, in the technical field of paper, the basis weight is used as a parameter instead of the thickness.

The type of the flavoring component contained in the first paper layer is not particularly limited, and publicly known flavoring components can be used. Examples thereof include menthol, leaf tobacco extract, natural vegetable flavors (e.g., cinnamon, sage, herb, chamomile, kudzu, sweet *Hydrangea* leaves, clove, lavender, cardamom. Eugenia caryophyllus, nutmeg, bergamot, geranium, honey essence, rose oil, lemon, orange, *cassia* bark, caraway, jasmine, ginger, coriander, vanilla extract, spearmint, peppermint, *cassia*, coffee, celery, cascarilla, sandalwood, cocoa, ylang-ylang, fennel, anise, licorice, Saint John's bread, plum extract, and peach extract), saccharides (e.g., glucose, fructose, isomerized sugar, caramel, honey, and molasses), cocoas (e.g., powder and extract), esters (e.g., isoamyl acetate, linalyl acetate, isoamyl propionate, and linalyl butyrate), ketones (e.g., menthone, ionone, damascenones, and ethyl maltol), alcohols (e.g., geraniol, linalool, anethole, and eugenol), aldehydes (e.g., vanillin, benzaldehyde, and anisaldehyde), lactones (e.g., γ-undecalactone and γ-nonalactone), animal flavors (e.g., musk, ambergris, civet, and castoreum), and hydrocarbons (e.g., limonene and pinene). These substances may be used alone, or any two or more of them may be used in combination in any ratio.

Of these, menthol is preferred. In the exemplary embodiment in which a crystalline substance such as menthol is contained in the flavoring material, the above-described problem of deterioration in appearance due to crystallization is likely to occur; therefore, the effect obtained by employing the configuration of this embodiment is significant.

The content of the flavoring component contained in the first paper layer is not particularly limited but is typically 2 gsm or more, and 20 gsm or less from the viewpoint that a sufficient amount of flavoring component can be imparted to tobacco products.

[Barrier Layer]

The barrier layer 202 is not particularly limited as long as it has barrier properties against the flavoring component.

The material (main constituent material) of the barrier layer 202 is not particularly limited and may be, for example, a resin. Specifically, examples thereof include nitrocellulose, methyl cellulose, ethyl cellulose, carboxymethyl cellulose, hydroxyethyl cellulose, hydroxyethylmethyl cellulose, starch, completely saponified polyvinyl alcohol, partially saponified polyvinyl alcohol, ethylene-copolymerized polyvinyl alcohol, polyvinylpyrrolidone, alkyd resins, polyamide resins, polyester resins, copolymer such as styrene-butadiene, and aqueous dispersion emulsions of polyolefins or the like. Examples of the resin that is particularly preferably used in an extrusion method include low-density polyethylene, high-density polyethylene, and polypropylene. These may be used alone, or any two or more of them may be combined in any ratio and used as a mixture.

The barrier layer 202 may be formed of two or more layers formed by using different types of materials. When a glue layer described later is provided adjacent to the barrier layer 202 and the glue layer has barrier properties, the glue layer is treated as a barrier layer.

The content of the main constituent material in the barrier layer 202 is not particularly limited, but from the viewpoint that permeation of the flavoring component can be sufficiently reduced, the content is typically 50% by weight or more, preferably 60% by weight or more, more preferably 70% by weight or more, still more preferably 80% by weight or more. There is no need to set the upper limit, and the content of the main constituent material may be 100% by weight or less and may be 90% by weight or less.

The method for forming the barrier layer 202 is not particularly limited, and the barrier layer 202 can be formed by, for example, a coating method or an extrusion method. When the barrier layer 202 is formed by any of these methods, only the barrier layer 202 may be prepared, and the barrier layer 202 may then be laminated with other layers (e.g., the first paper layer 201 and/or the second paper layer 203), or the preparation of the barrier layer 202 and lamination with the other layers may be performed at the same time. Exemplary embodiments of the coating method and the extrusion method are not particularly limited, and publicly known methods can be appropriately employed.

The thickness of the barrier layer 202 is not particularly limited, but from the viewpoint of being capable of achieving a sufficient barrier against the flavoring component, it is typically 0.2 μm or more, preferably 0.7 μm or more, more preferably 2 μm or more, and from the viewpoint of the ease of production, it is typically 60 μm or less, preferably 45 μm or less, more preferably 20 μm or less.

In particular, when the barrier layer 202 is formed by a coating method, from the viewpoint of being capable of achieving a sufficient barrier against the flavoring component and the viewpoint that it becomes difficult to achieve a complete cover with a coating liquid in the case of the formation by coating, the thickness of the barrier layer 202 is typically 0.2 μm or more, preferably 0.3 μm or more, more preferably 0.7 μm or more, and from the viewpoint of reducing the load on drying after coating, it is typically 25 μm or less, preferably 19 μm or less, more preferably 13 μm or less.

When the barrier layer 202 is formed by an extrusion method, from the viewpoint of being capable of achieving a sufficient barrier against the flavoring component and the viewpoint that it becomes difficult to achieve a complete cover in the case of the formation by extrusion, the thickness of the barrier layer 202 is typically 15 μm or more, and from the viewpoint of the ease of production, it is typically 60 μm or less, preferably 45 μm or less, more preferably 20 μm or less.

The basis weight of the barrier layer 202 is not particularly limited, but from the viewpoint of being capable of achieving a sufficient barrier against the flavoring component, the basis weight of the barrier layer 202 is typically 0.3 gsm or more, preferably 1 gsm or more, more preferably 3 gsm or more, still more preferably 10 gsm or more, particularly preferably 13 gsm or more, and from the viewpoint of the ease of production, it is typically 56 gsm or less, preferably 42 gsm or less, more preferably 20 gsm or less.

In particular, when the barrier layer 202 is formed by a coating method, the basis weight of the barrier layer 202 is not particularly limited, but from the viewpoint of being capable of achieving a sufficient barrier against the flavoring component and the viewpoint that it becomes difficult to achieve a complete cover with a coating liquid in the case of the formation by coating, the basis weight of the barrier layer 202 is preferably 0.3 gsm or more, more preferably 0.5 gsm or more, still more preferably 1 gsm or more, still further more preferably 2 gsm or more, particularly preferably 3 gsm or more, and from the viewpoint of reducing the load on drying after coating, it is typically 20 gsm or less, preferably 15 gsm or less, more preferably 10 gsm or less.

When the barrier layer 202 is formed by an extrusion method, from the viewpoint of being capable of achieving a sufficient barrier against the flavoring component and the viewpoint that it becomes difficult to achieve a complete cover in the case of the formation by extrusion, the basis weight of the barrier layer 202 is typically 13 gsm or more, and from the viewpoint of the ease of production, it is typically 56 gsm or less, preferably 42 gsm or less, more preferably 19 gsm or less.

When the barrier layer 202 is formed by coating, the method for coating is not particularly limited, and the coating can be performed by any publicly known coating device or coating system. Examples of the coating device include a blade coater, a bar coater, a roll coater, an air knife coater, a reverse roll coater, a curtain coater, a spray coater, a size press coater, and a gate roll coater. Examples of the coating system include a water-based coating system using a solvent such as water and a solvent-based coating system using a solvent such as an organic solvent. As a method for drying the barrier layer 202, an ordinary method using, for example, a steam heater, a gas heater, an infrared heater, an electric heater, a hot air heater, a microwave oven, or a cylinder dryer can be used.

The barrier layer 202 may contain a component other than the main constituent material, and the other component may be, for example, a filler or a pigment.

When the barrier layer 202 is formed by an extrusion method, production conditions are not particularly limited, and the barrier layer 202 can be formed by applying, to a surface of the first paper layer or the second paper layer, a molten product of a material, such as a resin, melted at a temperature appropriate to the material and performing cooling. Alternatively, such a molten product may be applied to another member without being directly applied to a surface of the first paper layer or the second paper layer, and then separated to prepare a barrier layer, and this barrier layer may be bonded to the first paper layer or the second paper layer.

The extrusion temperature can be appropriately set according to the raw material but is typically 200° C. or higher, and typically 400° C. or lower.

The barrier properties of the barrier layer 202 can be evaluated by the following methods, and preferably satisfy (Condition 1) or (Condition 2) below and more preferably satisfy both the conditions.

(Condition 1) Operations (1) to (4) below using the barrier layer are performed five times, and permeation of ethanol is not visually observed in any of the resulting five specimens.

(1) A specimen in which the barrier layer is disposed on a substrate is prepared.

(2) The specimen is placed on a flat surface such that the barrier layer faces upward. It is preferable to perform this operation without touching the surface of the barrier layer.

(3) Three drops of ethanol (purity: 99.5% or more) are dropped from a height of 25 mm onto the barrier layer with a pipette. This operation is preferably performed such that the pipette does not touch the barrier layer.

(4) Ten minutes later, the ethanol adhering to the barrier layer is wiped off with tissue paper. Note that if all the ethanol has evaporated, wiping is not necessary.

The type of the substrate is not particularly limited as long as a barrier layer can be formed, and the substrate may be, for example, paper (which may be paper other than the paper used as the first paper layer and the second paper layer). For example, the foregoing Western paper such as printing paper, wrapping paper, or thin paper can be used as the paper. A substrate containing a flavoring component may be used, and, for example, the first paper layer or the second paper layer may be used.

The specimen used may be one prepared by removing the barrier layer from the tobacco product packaging material and disposing the barrier layer on a substrate, one prepared by removing the first paper layer or the second paper layer from the packaging material, or one prepared by disposing, on a substrate, a layer formed of the same material as the material of the barrier layer and having the same thickness as that of the barrier layer. The size of the specimen is not particularly limited as long as the above operations can be performed, can be appropriately determined according to the size of the tobacco product packaging material 200, and may be, for example, 20 mm. 20 mm, 30 mm. 30 mm, 40 mm. 40 mm, or 50 mm. 50 mm.

The evaluation is conducted in an environment at a temperature of 23° C.±1° C. and a humidity of 50%±3%.

Figure 2:
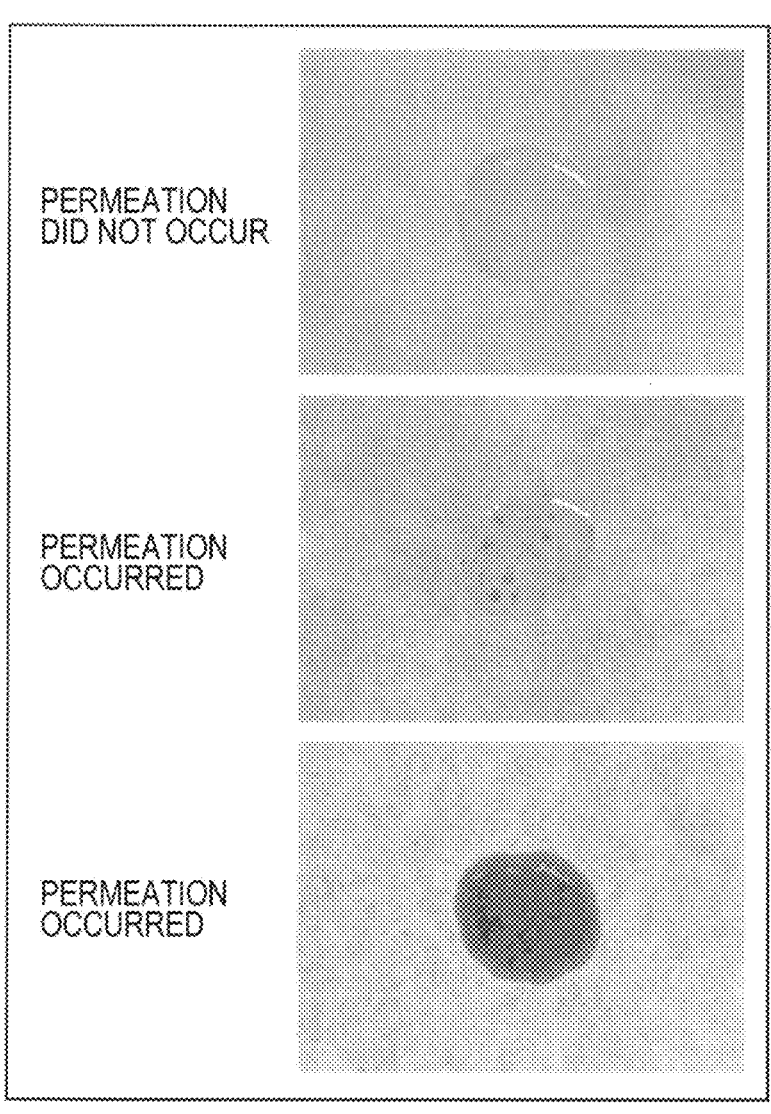
FIG. 2 includes views showing an example of visual observation results of permeation of ethanol in a barrier property test of a barrier layer (photographs serving as substitutes for drawings).

FIG. 2 shows an example of visual observation results of permeation of ethanol in the above test. These evaluation results of the observation of permeation can similarly also apply to evaluation results of the observation of permeation under (Condition 2) and (Condition 2') below. FIG. 2 shows, regardless of any of the tests under (Condition 1). (Condition 2), or (Condition 2'), in the case where permeation occurred in a paper layer (or paper) (assuming that paper is used as a substrate under (Condition 1) and (Condition 2')), how the permeation is visually observed.

(Condition 2) A tobacco product packaging material is used, a flavor is applied to the first paper layer such that the basis weight is 10 gsm, and at a time of holding for 14 days, permeation of the flavor is not visually observed on the second paper layer.

A test under (Condition 2') below can also be performed as a test alternative to the test under (Condition 2).

(Condition 2') Operations (1) to (3) below using the barrier layer are performed, and, in the resulting specimen, a stain is not visually observed in a second substrate.

(1) A specimen is prepared in which a first substrate is laminated on (brought into close contact with) one surface of a barrier layer, and a second substrate is laminated on (brought into close contact with) the other surface of the barrier layer. The barrier layer used may be a barrier layer taken out from a tobacco product packaging material.

(2) A flavor is applied to the first substrate such that the basis weight is 10 gsm.

(3) After the application of the flavor, holding is performed for 14 days.

In the test under (Condition 2) and the test under (Condition 2'), the same evaluation results are usually obtained because there is no difference in the barrier layer to be subject to the evaluation.

As for the types of the first substrate and the second substrate and the size of the specimen, the conditions for those in (Condition 1) above can be similarly applied, independently.

The tests under (Condition 2) and (Condition 2') are performed in a state where the test object is disposed such that the paper layer (or paper) to which the flavor is applied is directed vertically upward.

The tests for evaluating the barrier properties according to (Condition 1) and (Condition 2') above may be performed by, instead of using the barrier layer taken out from the tobacco product packaging material 200, preparing a sheet with a material and a shape similar to those of the barrier layer. For example, in the operation (1) of (Condition 1) above. "only the barrier layer is taken out from the tobacco product packaging material, the barrier layer is brought into close contact with paper different from paper constituting the paper layer 1 and the paper layer 2, and a specimen is cut out" may be paraphrased that "a sheet (including a film shape) with a material and a shape similar to those of the barrier layer in the tobacco product packaging material is prepared, and the sheet is brought into close contact with paper different from paper constituting the paper layer 1 and the paper layer 2, and a specimen is cut out". The "barrier layer" in the operations (2) to (4) in (Condition 1) above may be paraphrased as a "sheet". The tests may be performed in such a manner.

[Second Paper Layer]

An exemplary embodiment of the second paper layer 203 is not particularly limited, publicly known paper can be used, and, for example. Western paper can be used. Specifically, printing paper, wrapping paper, thin paper, or the like can be used. From the viewpoints that bending of the packaging material 200 when the packaging material 200 is folded around the tobacco products is facilitated and the production process is simplified, and that the second paper layer 203 can be more easily decomposed, and therefore, a package that is more environmentally conscious can be provided, the content of a fibrous cellulose-based material is typically 30% by weight or more, preferably 50% by weight or more, more preferably 70% by weight or more. There is no need to set the upper limit, and the content of the fibrous cellulose-based material may be 100% by weight and may be 100% by weight or less.

The basis weight of the second paper layer 203 is not particularly limited, but from the viewpoint of machine suitability, it is preferably 20 gsm or more, and preferably less than 100 gsm, more preferably less than 70 gsm, still more preferably 50 gsm or less.

[Other Layers]

The tobacco product packaging material 200 may further include layers (other layers) other than the first paper layer 201, the barrier layer 202, and the second paper layer 203. Examples of the other layers include a glue layer for bonding the layers, and a coat layer serving as an outermost layer on a side where the second paper layer 203 is located when viewed from the barrier layer 202.

(Glue Layer)

Figure 3:
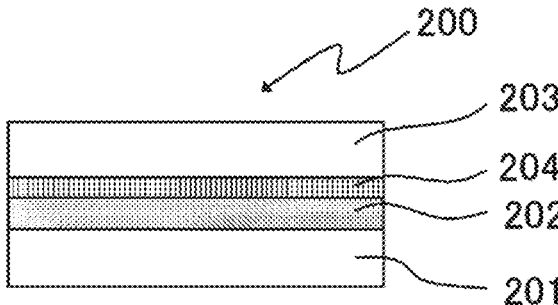
FIG. 3 is a view illustrating a layer structure of a tobacco product packaging material according to an embodiment of the present invention.

The tobacco product packaging material 200 may further include a glue layer 204 for bonding layers. Specifically, the glue layer 204 may be provided between the first paper layer 201 and the barrier layer 202 or may be provided between the barrier layer 202 and the second paper layer 203, as illustrated in FIG. 3. Note that when the glue layer 204 and the barrier layer 202 are provided adjacent to each other, and the glue layer 204 has barrier properties, the glue layer 204 is treated as a barrier layer as described above.

Examples of the method for forming the glue layer 204 include, but are not particularly limited to, a method including applying a molten liquid of the material constituting the glue layer 204 to one of layers to be bonded, bringing, into contact with the liquid, the other layer to be bonded, and then performing curing and a method including applying a solution prepared by dissolving the material constituting the glue layer 204 into a solvent to one of layers to be bonded, bringing, into contact with the solution, the other layer to be bonded, and then performing curing by removing the solvent. The solvent is not particularly limited as long as the solvent can dissolve the material constituting the glue layer 204.

The material of the glue layer 204 is not particularly limited as long as two layers to be bonded can be bonded together and may be, for example, a starch-based or vinyl acetate-based material, and specifically, for example, starch or vinyl acetate.

The basis weight of the glue layer 204 is not particularly limited and may be 0.3 gsm or more, and preferably 4 gsm or less, more preferably 2 gsm or less, still more preferably 1.5 gsm or less.

(Coat Layer)

Figure 4:
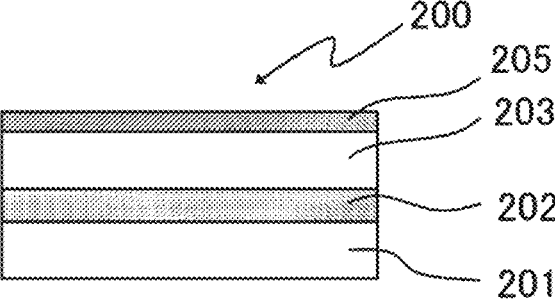
FIG. 4 is a view illustrating a layer structure of a tobacco product packaging material according to an embodiment of the present invention.

The tobacco product packaging material 200 may further include a coat layer 205 serving as an outermost layer on a side where the second paper layer 203 is located when viewed from the barrier layer 202, as illustrated in FIG. 4. By providing the coat layer 205, the flavoring component contained in the first paper layer can be prevented from transferring to the second paper layer side when the tobacco product packaging material 200 is stacked (for example, is subjected to bobbin winding), for example. Preferably, the material of the coat layer does not have adhesiveness in relation to the flavoring component contained in the first paper layer.

Examples of the method for forming the coat layer 205 include, but are not particularly limited to, a method including applying a molten liquid of the material constituting the coat layer 205 to the second paper layer 203, and then performing curing, a method including applying a solution prepared by dissolving the material constituting the coat layer 205 into a solvent, and then performing curing by removing the solvent, a method including providing a coat layer on the second paper layer 203 by flexographic printing or gravure printing, and a method including providing a coat layer on the second paper layer 203 by coating using the coating device described above. The solvent is not particularly limited as long as the solvent can dissolve the material constituting the coat layer 205.

The material of the coat layer 205 is not particularly limited as long as coating can be performed, but is preferably, for example, acryl: a cellulose derivative such as nitrocellulose or ethyl cellulose; or an aqueous dispersion emulsion of a polyolefin, acryl, or the like from the viewpoint that the material is excellent in terms of not having adhesiveness in relation to the flavoring component contained in the first paper layer.

The basis weight of the coat layer 205 is not particularly limited, but may be 0.1 gsm or more, and preferably 10 gsm or less, more preferably 4 gsm or less, still more preferably 2 gsm or less.

From the viewpoint of solving the problems of high production cost and a difficulty in recyclability when used as a packaging material, preferably, the tobacco product packaging material 200 does not include a metal layer such as a metal foil, e.g., an aluminum foil. In this description, this metal layer does not include a layer containing a metal powder such as a metal pigment, for example, a printed layer containing a metal pigment.

In the tobacco product packaging material 200, an ink related to a design, a brand logo, or the like may be printed on a surface of the outermost layer on the second paper layer 203 side when viewed from the barrier layer 202.

<Method for Producing Tobacco Product Packaging Material>

The method for producing the tobacco product packaging material 200 is not particularly limited, and the tobacco product packaging material 200 can be produced by a publicly known method that enables production of a laminate or by combining publicly known methods. Specific examples of the production method are described below.

(1) A method includes applying a solution prepared by dissolving the material constituting a barrier layer 202 in a solvent to a first paper layer 201, stacking a second paper layer 203 thereon, subsequently removing the solvent from the solution to form a barrier layer, and subsequently impregnating the surface of the first paper layer 201 with a flavoring component by a method such as application or dropwise addition.

(2) A method includes applying a solution prepared by dissolving the material constituting a barrier layer 202 in a solvent to a first paper layer 201, removing the solvent from the solution to form a barrier layer, subsequently providing a glue layer 204 thereon, stacking a second paper layer 203, and subsequently impregnating the surface of the first paper layer 201 with a flavoring component by a method such as application or dropwise addition.

In the methods (1) and (2) above, a wet laminator can be used. The solvent used in these methods is not particularly limited as long as the solvent can dissolve the material constituting the barrier layer 202.

(3) A method includes applying a molten resin of the material constituting a barrier layer 202 to the first paper layer 201, stacking a second paper layer thereon, subsequently curing the resin to form a barrier layer, and subsequently impregnating the surface of the first paper layer 201 with a flavoring component by a method such as application or dropwise addition.

In the method (3) above, an extruder can be used.

(4) A method includes preparing a first paper layer 201 impregnated with a flavoring component by a method such as application or dropwise addition, a barrier layer 202 formed by an application method or an extrusion method, and a second paper layer 203, and connecting the layers with a glue layer 204 together, as described in the description of the glue layer 204.

<Use of Tobacco Product Packaging Material>

The tobacco product packaging material 200 described above can be used in an available range, but preferably can be used for a tobacco product package described below.

<Tobacco Product Package>

A tobacco product package which is another embodiment of the present invention (hereinafter, also simply referred to as a "tobacco product package" or a "package") is a package formed using a tobacco product packaging material.

in which the tobacco product packaging material is the foregoing tobacco product packaging material (hereinafter, also simply referred to as a "packaging material"), and the tobacco product package includes tobacco products accommodated in an internal container formed using the tobacco product packaging material such that the first paper layer is positioned inside.

Specific embodiments of the tobacco product package will be described below. Embodiments 1 and 2 described below are exemplary embodiments in which bonding is performed using an adhesive but, alternatively, may be exemplary embodiments in which no adhesive is used, for example, exemplary embodiments in which the tobacco product packaging material 200 is folded to accommodate tobacco products.

Embodiment 1

Figure 5:
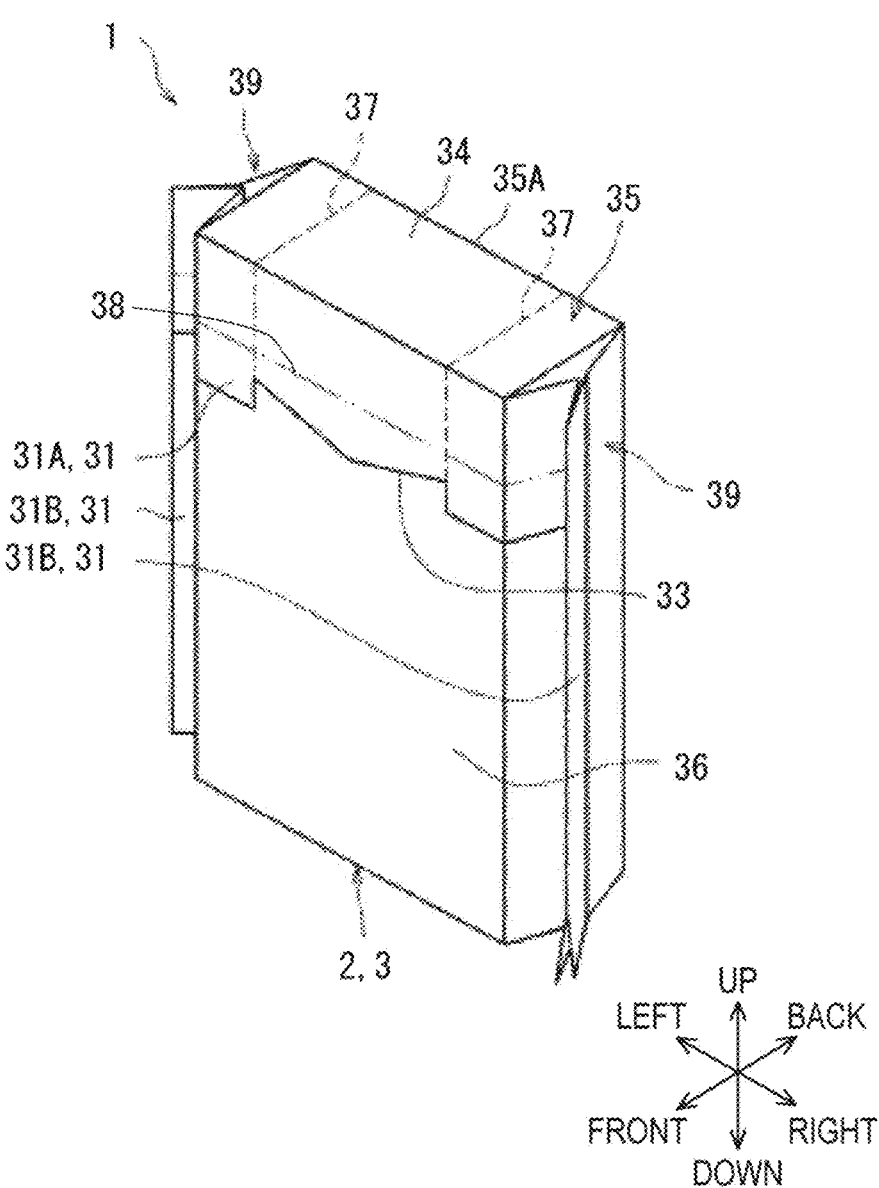
FIG. 5 is an external perspective view of a tobacco product package according to Embodiment 1.
Figure 6:
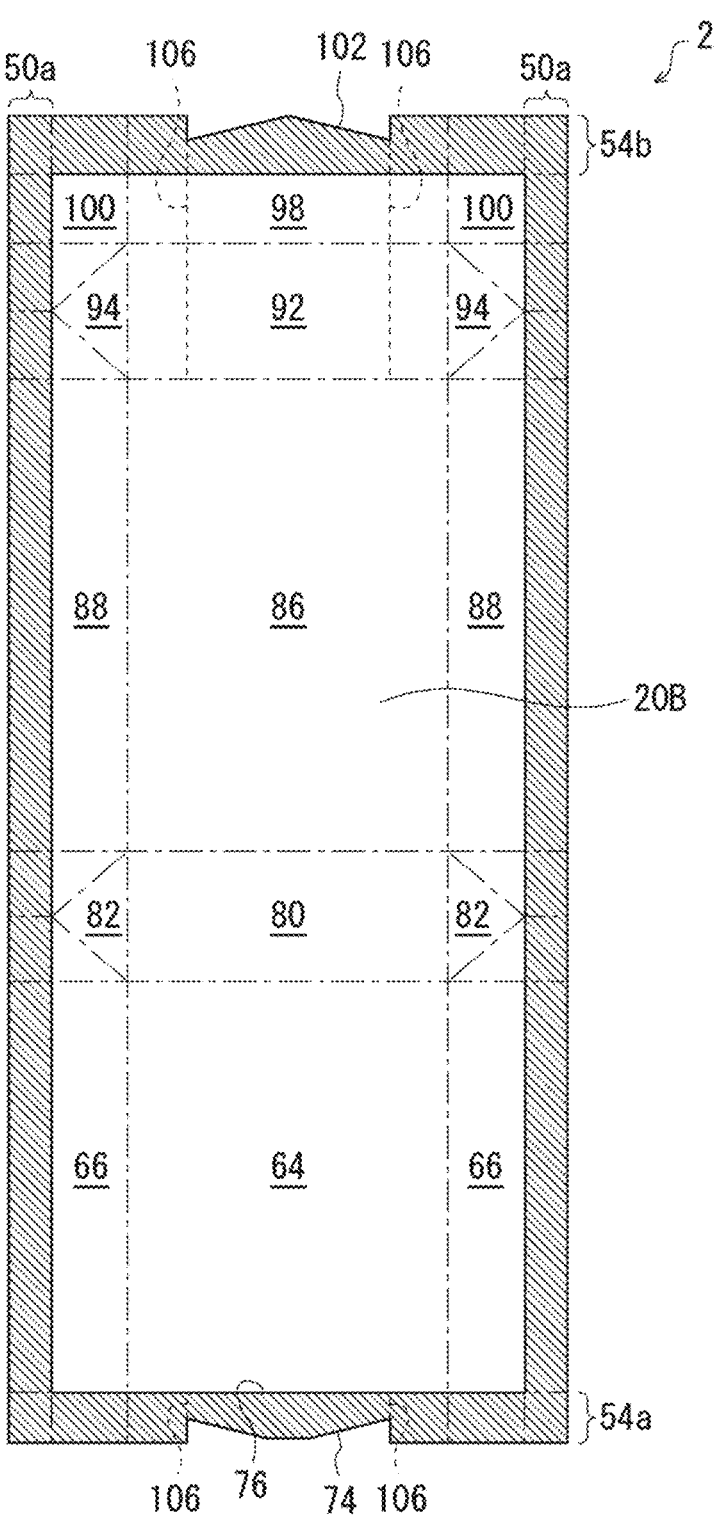
FIG. 6 is a plan view illustrating a sheet-tobacco product packaging material for forming the package according to Embodiment 1.

FIG. 5 is an external perspective view of a tobacco product package 1 according to Embodiment 1. FIG. 6 is a plan view illustrating a sheet-tobacco product packaging material 2 for forming the package 1 according to Embodiment 1. The package 1 has a substantially rectangular parallelepiped box shape and includes an outer sheath 3 that is prepared by folding the sheet-packaging material 2 illustrated in FIG. 6 and accommodates a bundle of tobacco products. A sealed internal container is formed inside the outer sheath 3 of the package 1, and the tobacco products are accommodated in the internal container.

FIG. 5 illustrates the frontward, backward, upward, downward, left and right directions of the package 1. However, the frontward, backward, upward, downward, left, and right directions of the package 1 are used to describe the relative positional relationships among portions of the package 1 and do not indicate the absolute directions of the package 1. The upward-downward direction of the package 1 may be referred to as a "height direction", the left-right direction may be referred to as a "width direction", and the forward-backward direction may be referred to as a "depth direction".

The outer sheath 3 of the package 1 is formed by folding the sheet-packaging material 2 and bonding edge portions of the packaging material 2 together by application of an adhesive such as a glue to seal the internal container that accommodates the tobacco products. In the example illustrated in FIG. 6, the packaging material 2 has a rectangular shape and is folded around the tobacco products to form the outer sheath 3 that encloses the tobacco products in a sealed manner. The layer structure of the packaging material 2 and details thereof will be described later.

Reference numeral 31 shown in FIG. 5 represents bonded portions formed by bonding together overlapping edge portions of the outer sheath 3 (the packaging material 2) with an adhesive such as a glue. The bonded portions 31 include a lateral bonded portion 31A extending in the width direction (the left-right direction) of the package 1 and longitudinal bonded portions 31B extending in the height direction (the upward-downward direction) of the package 1. When the lateral bonded portion 31A and the longitudinal bonded portions 31B are not particularly distinguished from each other, they are simply referred to as the bonded portions 31. In the present embodiment, each bonded portion 31 is formed by overlapping edge portions of the outer sheath 3 (packaging material 2) in the form of a fin seal.

In the present embodiment, in order to bond the packaging materials together, a method of providing bonded portions is employed. Alternatively, a method of fixing from the outside with an adhesive tape or the like may be employed without using an adhesive.

As illustrated in FIG. 5, the longitudinal bonded portions 31B are provided on the left and right sides of the package 1. Each of the longitudinal bonded portions 31B extends from the upper end to the lower end of the package 1. The lateral bonded portion 31A extends across an entire region in the width direction of the package 1 from one of the longitudinal bonded portions 31B to the other longitudinal bonded portion 31B. Both end portions of the lateral bonded portion 31A overlap the respective longitudinal bonded portions 31B.

In the example illustrated in FIG. 5, a flat substantially M-shaped notch is formed at the center of a leading edge of the lateral bonded portion 31A. This notch provides a V-shaped tab 33 for the lateral bonded portion 31A. However, the tab 33 is not essential for the package 1 and may be omitted as appropriate. For example, the shape and the position of the tab 33 are also not particularly limited.

The outer sheath 3 of the package 1 includes a separable section 34 extending to the tab 33. The separable section 34 is a strip-shaped section demarcated by a pair of first separation lines 37 so as to extend from a back edge 35A of an upper surface 35 of the outer sheath 3 to a front surface 36 of the outer sheath 3. The first separation lines 37 extend upward from both ends of the V-shaped tab 33 and across the upper surface 35 and reach the back edge 35A. On the front surface 36 of the outer sheath 3, a second separation line 38 is provided above the tab 33. The second separation line 38 extends in the width direction of the package 1. The first separation lines 37 and the second separation line 38 are formed of weakened portions. The "weakened portions" are a part of the surface of the outer sheath 3 of the package 1 (or the packaging material 2 forming the outer sheath 3), the part having a strength weaker than that of the other part. For example, the weakened portions may be formed by subjecting the packaging material 2 to processing (for example, half-cutting) such that the thickness of the weakened portions is smaller than that of the other part. In the present embodiment, preferably, rows of perforations formed by forming small holes in the packaging material 2 are not used as the "weakened portions" in order to ensure hermeticity of the package 1. Reference numeral 39 shown in FIG. 5 represents side surfaces of the outer sheath 3 of the package 1. In the case where the weakened portions are formed by subjecting the packaging material 2 to half-cutting, if the weakened portions are formed on a barrier layer 202 side to be described in FIG. 7, the barrier properties may be impaired; therefore, the weakened portions are preferably provided in a second paper layer 203, which does not largely contribute to the barrier properties. When the package is configured such that the second paper layer is located on the outside, the second paper layer covers the first paper layer containing a flavoring component and the barrier layer, and thus the problem of deterioration in appearance is solved.

Figures 7, 8:
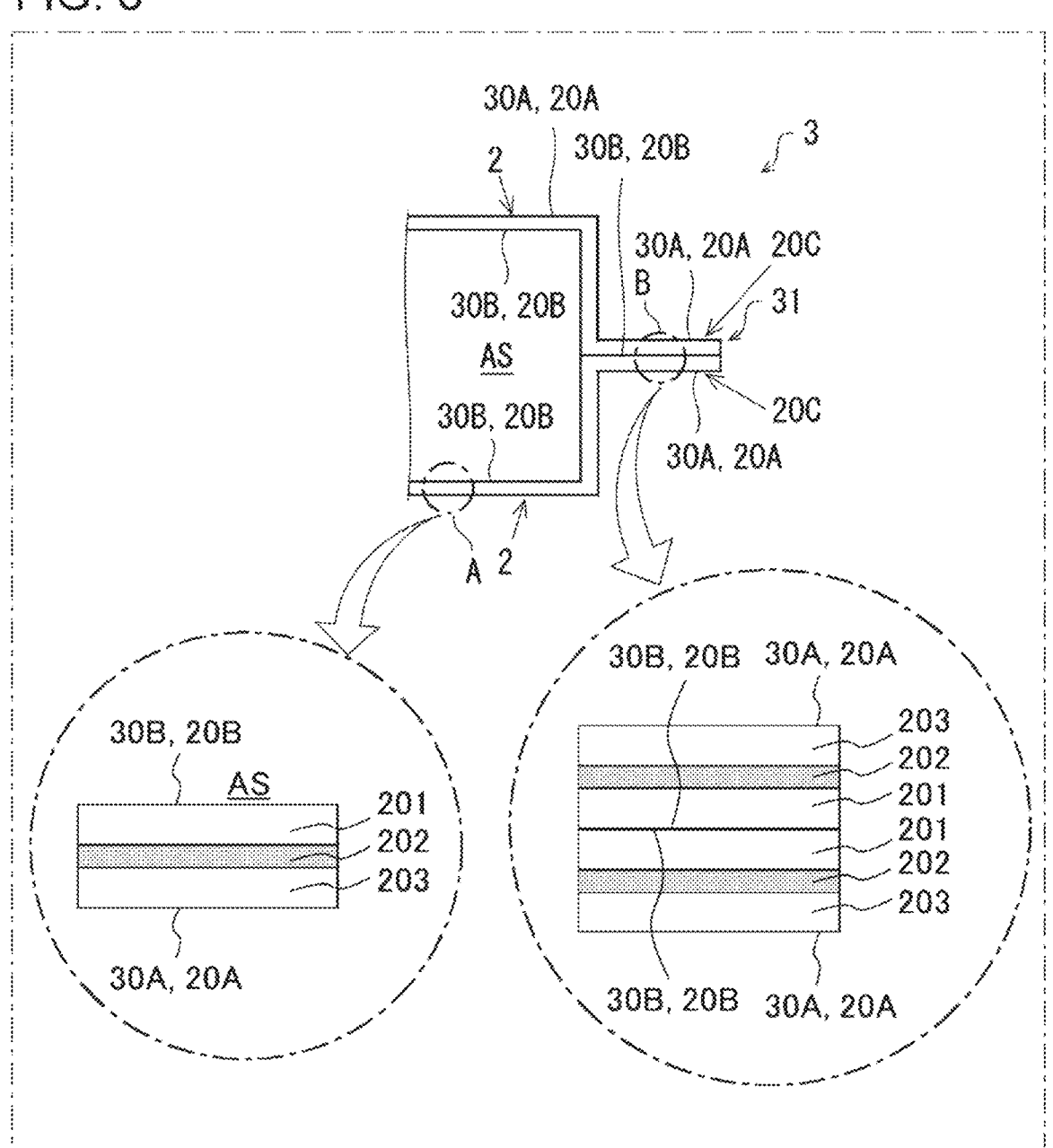
FIG. 7 is a view illustrating a layer structure of the tobacco product packaging material forming the package according to Embodiment 1.
FIG. 8 is a view that schematically illustrates a cross-sectional structure of an outer sheath in the package according to Embodiment 1.

FIG. 7 is a view illustrating the layer structure of the packaging material 2 forming the outer sheath 3 of the package 1 according to Embodiment 1. The packaging material 2 is constituted by a three-layer structure that includes a first paper layer 201 containing a flavoring component, a barrier layer 202 having barrier properties against the flavoring component, and a second paper layer 203, in which the barrier layer 202 is disposed so as to be positioned between the first paper layer 201 and the second paper layer 203 as in the packaging material 2 in FIG. 1.

Portions where the packaging materials 2 are laminated together may be bonded with an adhesive such as a glue.

Reference numeral 20B shown in FIG. 7 represents a first surface of the packaging material 2, and reference numeral 20A represents a second surface of the packaging material 2 located opposite to the first surface 20B. The first outer surface 20B and the second outer surface 20A of the packaging material 2 are formed by the surfaces of materials located as the outer layers in the packaging material 2. Reference numeral 30A that is also shown in FIG. 7 represents the outer surface of the outer sheath 3 (see FIG. 5), and reference numeral 30B represents the inner surface of the outer sheath 3. The term "inner surface" as used herein is used to represent the surface of an assembled package 1 (the outer sheath 3) that faces the internal container formed inside the package 1 (the outer sheath 3) (for example, faces the tobacco products). The term "outer surface" as used herein is used to represent the surface of the package 1 (the outer sheath 3) that is exposed to the outside, that is, the surface located on the opposite side of the "inner surface."

In the exemplary embodiment illustrated in FIG. 7, a description will be made using the following example. In a state where the packaging material 2 is folded to form the package 1 (the outer sheath 3), the second surface 20A of the packaging material 2 is disposed so as to face the outer side to thereby form the outer surface 30A of the outer sheath 3. In addition, the first surface 20B of the packaging material 2 is disposed so as to face the inner side (the internal container side, tobacco product side) to thereby form the inner surface 30B of the outer sheath 3.

As illustrated in FIG. 7, the packaging material 2 has a layer structure in which the first paper layer 201, the barrier layer 202, and the second paper layer 203 are stacked from the first surface 20B side (the inner surface 30B side of the outer sheath 3 in the form of a package) toward the second surface 20A side (the outer surface 30A side of the outer sheath 3 in the form of a package). In the layer structure of the packaging material 2 illustrated in FIG. 7, the second paper layer 203 forms the outer layer of the packaging material 2.

The tobacco products accommodated in the internal container of the package 1 in the present embodiment are not particularly limited, and various types of products containing tobacco raw materials can be used. For example, the tobacco products may be smoking articles such as cigarettes, cigars, or cigarillos or snuff such as snus. The tobacco products accommodated in the package 1 may be non-combustible smoking articles including a carbonaceous heat source and an aerosol generation unit. The tobacco products may be tobacco sticks used for non-combustion-heating-type tobacco products.

Next, the form of folding the packaging material 2 when the package 1 is assembled will be described with reference to FIG. 6. As described above, the packaging material 2 illustrated in FIG. 6 has a rectangular sheet form. FIG. 6 is a plan view (development view) of the packaging material 2 when the first surface 20B thereof (the surface that becomes the inner surface 30B of the outer sheath 3) is viewed from above. Dash-dotted lines illustrated in FIG. 6 represent fold lines formed in the packaging material 2. As is clear from the plan view (development view) illustrated in FIG. 6, regions of the packaging material 2 that are demarcated by the fold lines form respective portions of the outer sheath 3 illustrated in FIG. 5.

More specifically, the packaging material 2 has regions including a lower front surface region 64 that becomes a part of the front surface 36 of the outer sheath 3 and further including a bottom surface region 80 that becomes the bottom surface of the outer sheath 3, a back surface region 86 that becomes the back surface of the outer sheath 3, an upper surface region 92 that becomes the upper surface of the outer sheath 3, and an upper front surface region 98 that becomes the rest of the front surface 36 of the outer sheath 3, which are located in this order on the upper side of the lower front surface region 64. Furthermore, side surface regions 66, 82, 88, 94, and 100 that form side surfaces of the outer sheath 3 are located on the left and right sides of the regions 64, 80, 86, 92, and 98, respectively.

Notch portions 74 and 102 that form the V-shaped tab 33 are formed in a lower end portion of the lower front surface region 64 of the packaging material 2 and an upper end portion of the upper front surface region 98, respectively. In the lower front surface region 64, the upper front surface region 98, and the upper surface region 92, weakened portions 106 for forming the first separation lines 37 and weakened portions 76 for forming the second separation line 38 are provided to form the separable section 34 described above. Note that dash-dotted lines in the side surface regions 82 and 94 of the packaging material 2 indicate that the packaging material 2 is to be gusseted in these side surface regions 82 and 94 when the packaging material 2 is folded. Lower edge portions 54a of the lower front surface region 64 and the side surface regions 66 (the lower edge portions being hatched in FIG. 6) and upper edge portions 54b of the upper front surface region 98 and the side surface regions 100 (the upper edge portions being hatched in FIG. 6) are to be overlapped with each other to form the lateral bonded portion 31A with an adhesive such as a glue. In each of the left and right side surface regions of the packaging material 2, an outer side edge portion 50a (hatched in FIG. 6) of the side surface region on the same side is folded up to form the corresponding longitudinal bonded portions 31B with an adhesive such as a glue. In the packaging material 2, end portions of the lower edge portions 54a and the upper edge portions 54b are connected to end portions of the pair of outer side edge portions 50a, and as a result, these edge portions are formed in an outer edge region of the packaging material 2 so as to form a rectangular frame shape as a whole.

The packaging material 2 configured as described above is folded around the bundle of the tobacco products to form the outer sheath 3 having the internal container that encloses the tobacco products in a sealed manner. In the formation of the packaging material 2 into a package form, first, the bundle of the tobacco products is placed on, for example, the back surface region 86 of the packaging material 2, and in this state, the regions of the packaging material 2 are then successively folded along the fold lines. In this case, the lower edge portions 54a of the lower front surface region 64 and the side surface regions 66 and the upper edge portions 54b of the upper front surface region 98 and the side surface regions 100 are bonded together so as to overlap with each other. At this time, the overlapping edge portions of the packaging material 2 are bonded together such that bonding portions formed as the outer layer on the first surface 20B side overlap with each other.

As a result, the bonding portions are bonded to each other, and the lateral bonded portion 31A is thereby formed.

Once the lateral bonded portion 31A has been formed, the packaging material 2 forms rectangular portions protruding from both sides of the bundle of the tobacco products. These rectangular portions are gusseted in the side surface regions 82 and 94, the side surface regions 66, 82, 88, 94, and 100 are folded along fold lines so as to cover the side surfaces of the bundle of the products on the respective sides to form the side surfaces of the outer sheath 3. The gussets in the side surface regions 82 and 94 are formed along the dash-dotted lines in the side surface regions 82 and 94 illustrated in FIG. 6. When the side surface regions 66, 82, 88, 94, and 100 are folded, bonding is performed such that outer side edge portions of side surface regions on the same side of the packaging material 2 are overlapped with each other. As a result, bonding portions are bonded to each other, and each of the longitudinal bonded portions 31B is thereby formed.

As described above, the outer sheath 3 is formed from the packaging material 2, and the formation of the package 1 with the tobacco products sealed in the internal container is completed. The packaging material 2 according to the present embodiment includes the second paper layer 203 containing a fibrous cellulose-based material, the barrier layer 202 stacked on the second paper layer 203, and the first paper layer 201. This can provide a packaging material 2 that enables easy production of the package 1 (outer sheath 3) and that can reduce leakage of the flavoring component contained in the paper layer to the outside and deterioration in appearance and a package 1 (outer sheath 3) using the packaging material 2.

FIG. 8 is a view that schematically illustrates a cross-sectional structure of the outer sheath 3 including a bonded portion 31 in the package 1 according to Embodiment 1. FIG. 8 illustrates the cross-sectional structure of the outer sheath 3 in a bonded portion 31 and the periphery of the bonded portion 31. Symbol AS shown in FIG. 8 represents the internal container AS sealed by the outer sheath 3. In FIG. 8, the tobacco products accommodated in the internal container AS are omitted. FIG. 8 also shows enlarged views of region A and region B surrounded by chain lines. Reference numeral 20C shown in FIG. 8 represents edge portions of the packaging material 2. The overlapping edge portions 20C of the packaging material 2 are bonded together in the form of a fin seal to thereby form the bonded portion 31.

As illustrated in the enlarged view of region A in FIG. 8, the first paper layer 201, the barrier layer 202, and the second paper layer 203 are stacked in this order from the inner surface 30B side of the outer sheath 3 (the first surface 20B side of the packaging material 2), and the second paper layer 203 forms the outer surface 30A of the outer sheath 3. The first paper layer 201 located on the first surface 20B side of the packaging material 2 forms the inner surface 30B of the outer sheath 3.

As illustrated in the enlarged view of region B in FIG. 8, in the present embodiment, the barrier layer 202 having barrier properties is disposed directly outside the first paper layer 201. With this structure, the barrier layers 202 can be in close contact with each other in the bonded portion 31.

The layer structure of the packaging material 2 in the present embodiment is not limited to that described in FIG. 7, and various other forms can be used. For example, the arrangement may be exchanged with the layer structure illustrated in FIG. 3 or FIG. 4.

Embodiment 2

Figure 9:
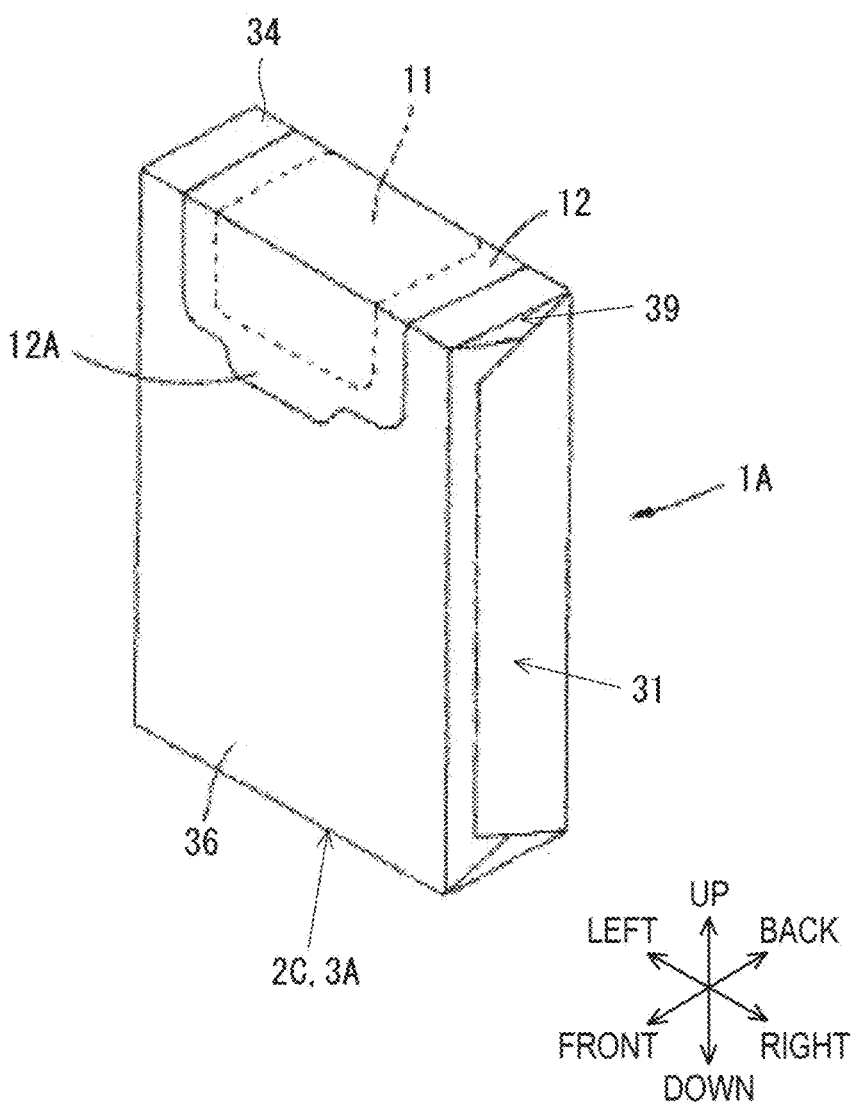
FIG. 9 is an external perspective view of a package in Embodiment 2.
Figure 10:
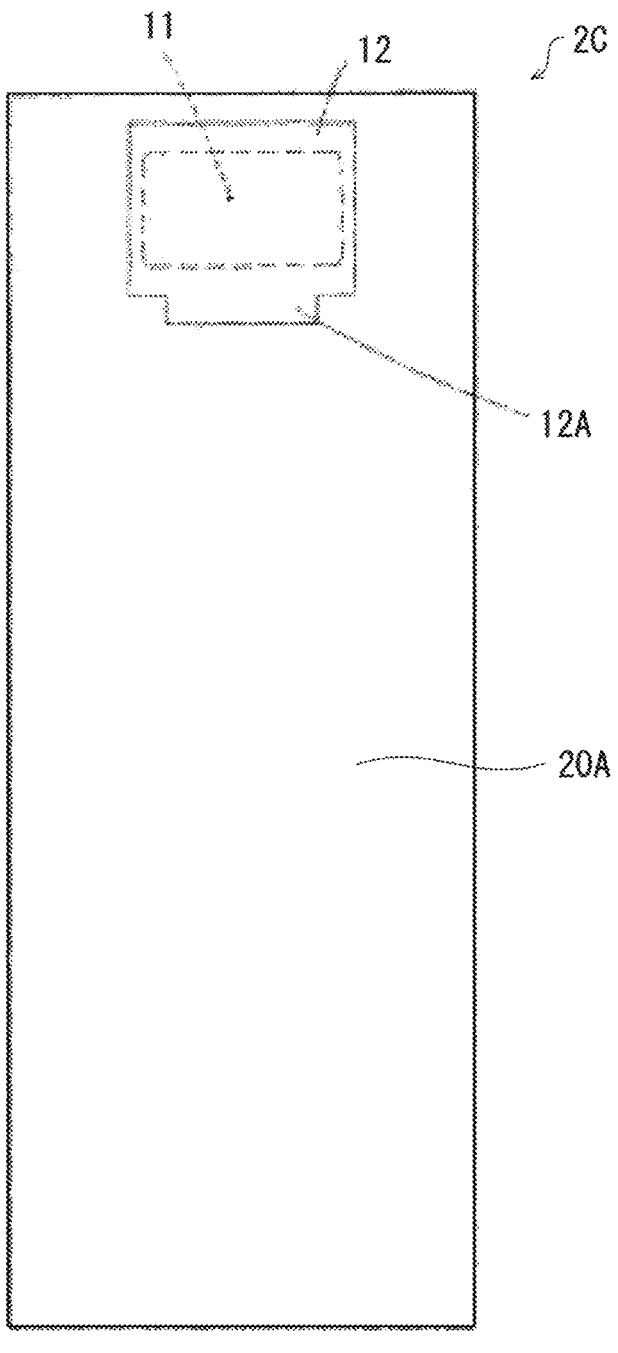
FIG. 10 is a plan view of a tobacco product packaging material for forming the package according to Embodiment 2.

Next, a package 1A according to Embodiment 2 will be described. In the present embodiment, the same structural elements as those in the embodiments described above are denoted by the same reference numerals, and their detailed description will be omitted. FIG. 9 is an external perspective view of the package 1A according to Embodiment 2. FIG. 10 is a plan view of a packaging material 2C for forming an outer sheath 3A of the package 1A according to Embodiment 2.

In the example illustrated in FIG. 9, the package 1A has a substantially rectangular parallelepiped box shape. The package 1A includes the outer sheath 3A that is formed into a package form by folding the sheet-shaped packaging material 2C illustrated in FIG. 10 and bonding edge portions of the packaging material 2C together by heat sealing. An internal container is formed inside the outer sheath 3A of the package 1A, and tobacco products are accommodated in the internal container.

FIG. 9 illustrates the frontward, backward, upward, downward, left, and right directions of the package 1A. However, the frontward, backward, upward, downward, left, and right directions of the package 1A are used to describe the relative positional relationships among portions of the package 1A and do not indicate the absolute directions of the package 1A. The upward-downward direction of the package 1A may be referred to as a "height direction", the left-right direction may be referred to as a "width direction", and the forward-backward direction may be referred to as a "depth direction".

In the figure, reference numeral 34 represents an upper surface of the package 1A, and reference numeral 36 represents a front surface of the package 1A, and reference numeral 39 represents a side surface of the package 1A. The package 1A has a withdrawing opening 11 through which a tobacco product can be withdrawn from the inside of the outer sheath 3A, and the withdrawing opening 11 is covered with a cover flap 12. The cover flap 12 is attached to the surface of the outer sheath 3A with, for example, a weak adhesive glue and is a re-peelable cover. The cover flap 12 has a tab 12A. The user can withdraw a tobacco product accommodated in the internal container by pulling up the cover flap 12 while pinching the tab 12A, and peeling at least a portion of the cover flap 12 from the outer surface 30A of the outer sheath 3A to thereby open the withdrawing opening 11.

FIGS. 11 to 14 are views illustrating a procedure for folding the packaging material 2C when the package 1A according to Embodiment 2 is assembled. As illustrated in FIG. 10, the sheet-packaging material 2C is prepared. The packaging material 2C has a rectangular shape as illustrated in FIG. 10. In the packaging material 2C, the withdrawing opening 11 is formed, and the cover flap 12 is attached to the second surface 20A of the packaging material 2C with a weak adhesive glue so as to cover the withdrawing opening 11. FIG. 10 is a plan view when the packaging material 2C is viewed from the second surface 20A side. In FIG. 10, fold lines of the packaging material 2C are omitted.

Figure 11:
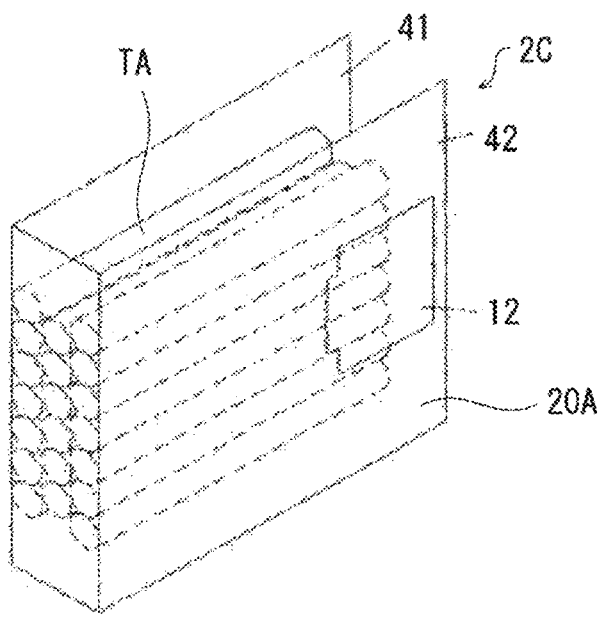
FIG. 11 is a view illustrating a procedure for folding the tobacco product packaging material when the package according to Embodiment 2 is assembled.
Figure 12:
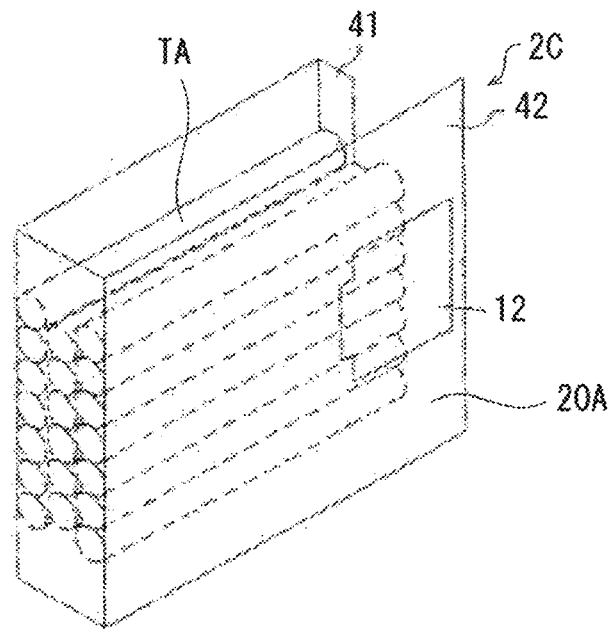
FIG. 12 is a view illustrating the procedure for folding the tobacco product packaging material when the package according to Embodiment 2 is assembled.
Figure 13:
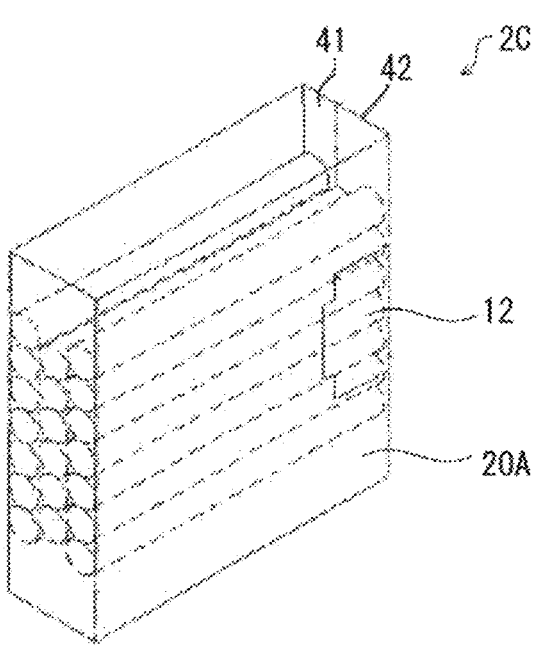
FIG. 13 is a view illustrating the procedure for folding the tobacco product packaging material when the package according to Embodiment 2 is assembled.

In assembling the package 1A, first, the packaging material 2C is folded along fold lines (not illustrated) in a U-shape so as to surround tobacco products TA as illustrated in FIG. 11. In this state, the packaging material 2C forms rectangular portions 41 and 42 protruding from an end face of the bundle of the tobacco products TA. Subsequently, as illustrated in FIGS. 12 and 13, the rectangular portions 41 and 42 are folded to cover the end face of the bundle of the tobacco products TA, the rectangular portion 42 is placed on the rectangular portion 41 so as to overlap each other, and the rectangular portions 41 and 42 are bonded together.

Figure 14:
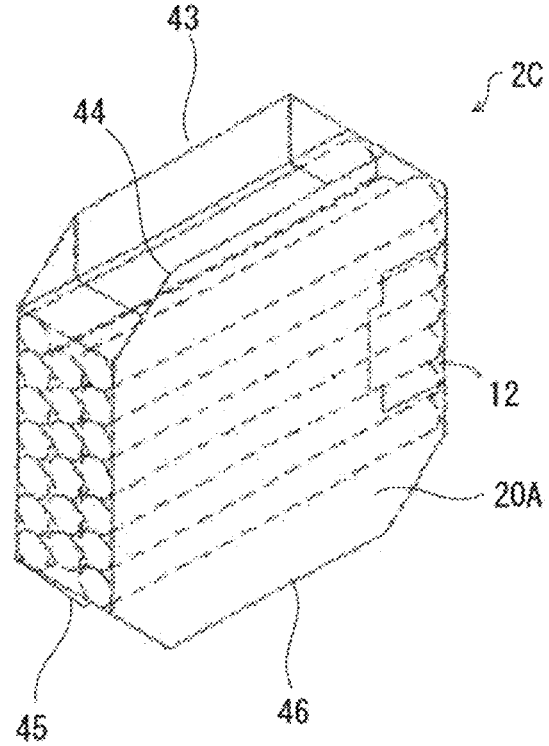
FIG. 14 is a view illustrating the procedure for folding the tobacco product packaging material when the package according to Embodiment 2 is assembled.

Next, in the packaging material 2C, protruding portions that protrude from both side surfaces of the bundle of the tobacco products TA are gusseted to form trapezoidal flaps 43 to 46 as illustrated in FIG. 14. Next, the trapezoidal flaps 43 to 46 are folded along their base end portions. In this case, the trapezoidal flaps 43 and 44 are bonded together such that the trapezoidal flap 43 is placed on the trapezoidal flap 44 to form a bonded portion 31. Similarly, the trapezoidal flaps 45 and 46 are bonded together such that the trapezoidal flap 45 is placed on the trapezoidal flap 46 to form a bonded portion 31 (see FIG. 9). As a result, the formation of the package 1A illustrated in FIG. 9 is completed.

Figure 15:
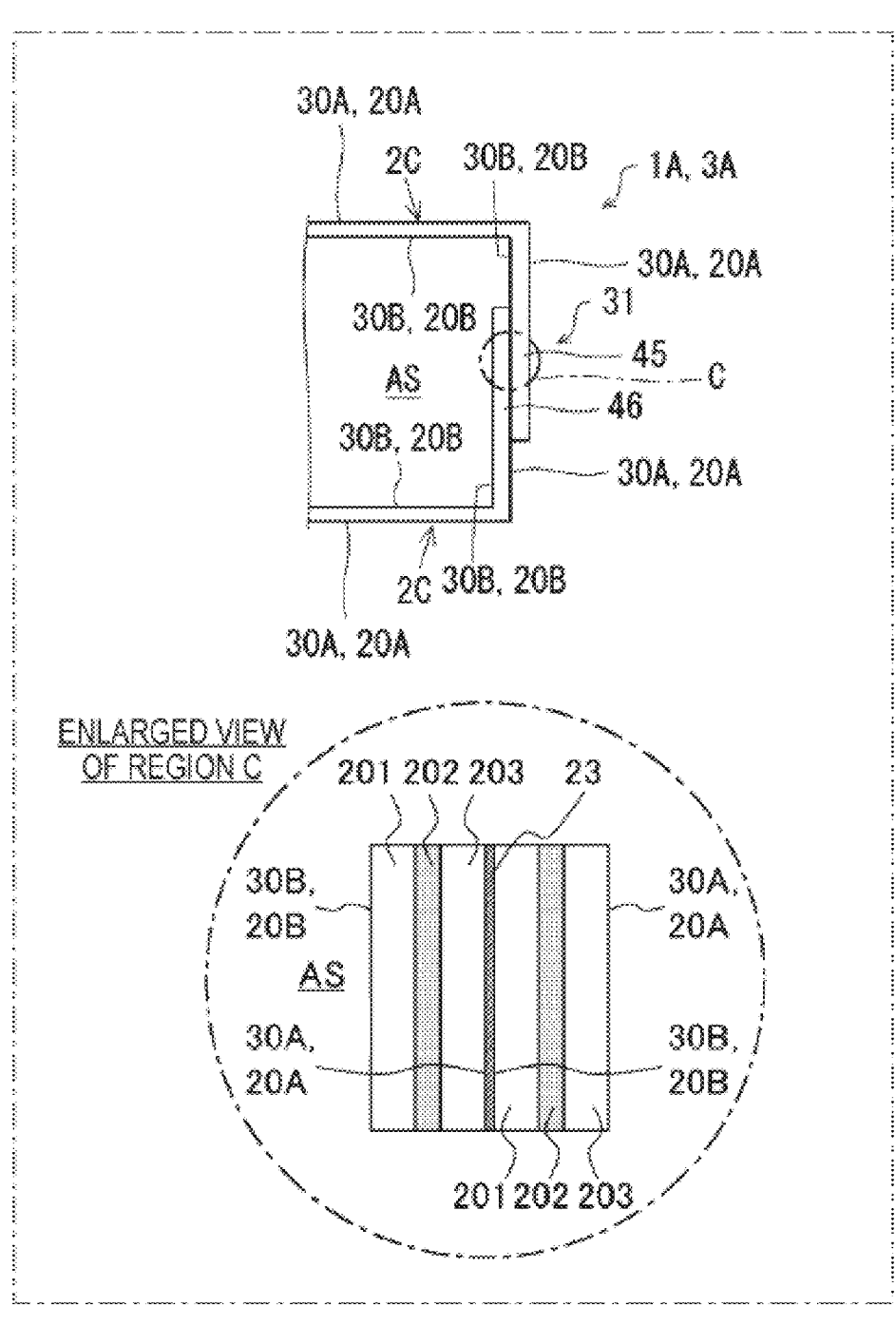
FIG. 15 is a view that schematically illustrates a cross-sectional structure of an overlapping portion of the tobacco product packaging material in the package according to Embodiment 2.

FIG. 15 is a view that schematically illustrates a cross-sectional structure of a portion near the bonded portion 31 in the package 1A according to Embodiment 2. In FIG. 15, the tobacco products accommodated in the internal container AS are omitted. FIG. 15 also schematically shows an enlarged view of region C surrounded by a chain line. The bonded portion 31 in the package 1A (the outer sheath 3A) includes the pair of trapezoidal flaps 45 and 46 overlapping each other, and the inner surface 30B of the trapezoidal flap 45 (the first surface 20B of the packaging material 2C) located on the upper side is bonded to the outer surface 30A of the trapezoidal flap 46 (the second surface 20A of the packaging material 2C) located on the lower side in the form of a lap seal. The lamination form of the trapezoidal flaps 43 and 44 in a bonded portion 31 on the other side surface 39 of the package 1A (the outer sheath 3A) is the same as the lamination form of the trapezoidal flaps 45 and 46 illustrated in FIG. 15. Specifically, in the package 1A according to Embodiment 2, a bonded layer 23 formed of an adhesive is formed on each of the outer surface 30A (the second surface 20A of the packaging material 2C) and the inner surface 30B (the first surface 20B of the packaging material 2C), and each bonded portion 31 is formed as a lap seal in which the bonded layer 23 formed on the inner surface 30B side of one edge portion of the packaging material 2C (on the first surface 20B side of the packaging material 2C) and the bonded layer 23 formed on the outer surface 30A side of the other edge portion (on the second surface 20A side of the packaging material 2C) are bonded in an overlapping manner.

As described above, the packaging material 2C in the present embodiment and the package 1A formed using the packaging material have the same effects as those of the packaging materials and the packages according to Embodiment 1 and the modifications described above. Specifically, the tobacco products TA can be sealed without sealing the package 1A with a separate external resin film, and the amount of resin material used can be reduced to provide the packaging material 2C and the package 1A that are more environmentally conscious than those in the related art.

The packages 1 and 1A formed using any of the packaging materials according to Embodiment 1 and Embodiment 2 described above may be distributed in the form of a pillow package illustrated in FIG. 5 or FIG. 9 or may be distributed in the form packed in a publicly known hard package or an external wrapping sheet of a soft package.

The embodiments of the tobacco product packaging material according to the present invention and the package formed using the tobacco product packaging material have been described. Exemplary embodiments disclosed in this description can be combined with any other features disclosed in this description.

In the measurement of the properties in this description, unless otherwise specified, a measurement sample is held in an environment similar to the measurement environment for 48 hours or more before the measurement. Unless otherwise specified, the measurement temperature, the measurement humidity, and the measurement pressure are normal temperature (22±2° C.), normal humidity (60±5% RH), and normal pressure (atmospheric pressure), respectively.

EXAMPLES

The present invention will be more specifically described below by way of Examples. However, the present invention is not construed as being limited to Examples described below.

Experiment 1: Evaluation of Barrier Properties

[Evaluation of Barrier Properties]

Barrier properties in the cases of using various materials were evaluated by the following method.

Operations of (1) to (4) below were performed five times, and whether or not permeation of ethanol was visually observed in the resulting five specimens was checked.

(1) In the cases where a polyolefin aqueous dispersion (CHEMIPEARLA100 manufactured by Mitsui Chemicals. Inc.), polyvinyl alcohol (PVA 117 manufactured by Kuraray Co., Ltd.), ethyl cellulose, or nitrocellulose was used as the material of a barrier layer, the material shown in Table 1 was provided on paper using a gravure printing method so as to have a weight per unit area (a basis weight of the final barrier layer) or a film thickness shown in Table 1 to form a film, the film was cut to a size of 50 mm×50 mm and used as a specimen. In the cases where low-density polyethylene (LDPE, SUMIKATHENEL420, manufactured by Sumitomo Chemical Co., Ltd.) was used as the material of a barrier layer, the molten polyethylene was extruded on a surface of paper by an extruder and then solidified by cooling to form a barrier layer having a thickness shown in Table 1, and the layer was cut to a size of 50 mm×50 mm and used as a specimen.

(2) The specimen was placed on a flat surface such that the film faces upward. This operation was performed so as not to touch the surface of the film.

(3) Three drops of ethanol (purity: 99.5% or more) were dropped from a height of 25 mm onto the film with a pipette. This operation was performed such that the pipette did not touch the film.

(4) Ten minutes later, the ethanol adhering to the film was wiped off with tissue paper.

Cases where permeation was not observed in all the five visual observations of permeation using the above five specimens were rated as "T", and cases other than this were rated as "F". The results are shown in Table 1. The evaluation was conducted in an environment at a temperature of 23° C.±1° C. and a humidity of 50%±3%.

The basis weight (gsm) in Table 1 is the weight per unit area, and this weight is a dry weight.

TABLE 1

| | Type of material | Weight per unit area (gsm) | Film thickness (μm) | Evaluation |
|---|---|---|---|---|
| Reference Example 1 | Polyolefin aqueous dispersion | 0.25 | — | F |
| Reference Example 2 | | 0.5 | — | T |
| Reference Example 3 | | 1 | — | T |
| Reference Example 4 | Polyvinyl alcohol | 0.25 | — | F |
| Reference Example 5 | | 0.5 | — | T |
| Reference Example 6 | | 1 | — | T |
| Reference Example 7 | Ethyl cellulose | 0.25 | — | F |
| Reference Example 8 | | 0.5 | — | T |
| Reference Example 9 | | 1 | — | T |
| Reference Example 10 | Nitrocellulose | 0.25 | — | F |
| Reference Example 11 | | 0.5 | — | T |
| Reference Example 12 | | 1 | — | T |
| Reference Example 13 | Low-density polyethylene | — | 15 | T |
| Reference Example 14 | (LDPE) | — | 30 | T |

As shown in Table 1, it was found that the films of Reference Examples 2 and 3, 5 and 6, 8 and 9, and 11 to 14 had barrier properties and could be used as barrier layers.

Experiment 2: Evaluation of Permeation in Tobacco Product Packaging Material

<Production of Tobacco Product Packaging Material>

Example 1

First, a first paper layer (manufactured by Chuetsu Pulp & Paper Co., Ltd., RAICHO 30 gsm) and a solution A in which ethyl cellulose was dissolved in ethyl acetate so as to have a solid content concentration of 10% by weight were prepared. The solution A was gravure-printed on a surface of the first paper layer such that the weight per unit area (the basis weight of the final barrier layer) became 0.5 gsm to form a barrier layer. Subsequently, a second paper layer (manufactured by Chuetsu Pulp & Paper Co., Ltd., RAICHO 30 gsm) was laminated on the barrier layer side using a wet laminator, and a mixture of a flavor (menthol) and a solvent was then applied to the surface of the first paper layer using a indicates that permeation occurred. The packaging material rated as "x" in the packaging suitability was not subjected to the permeation evaluation.

This evaluation of the occurrence of permeation can be regarded as the evaluation of barrier properties in (Condition 2') described above. The first paper layer and the second paper layer correspond to the first substrate and the second substrate, respectively, in (Condition 2') in the evaluation of barrier properties described above.

TABLE 2

| | Type of material | Weight per unit area (gsm) | Film thickness (μm) | Packaging suitability | Permeation evaluation | | |
|---|---|---|---|---|---|---|---|
| | | | | | 3 days | 7 days | 14 days |
| Comparative Example 1 | Ethyl cellulose | 0.25 | — | X | — | — | — |
| Example 1 | | 0.5 | — | ○ | ○ | ○ | ○ |
| Example 2 | Low-density polyethylene (LDPE) | — | 15 | ○ | ○ | ○ | ○ | nozzle such that the basis weight of the flavor became 10 gsm to produce a tobacco product packaging material.

Comparative Example 1

A tobacco product packaging material was produced by the same method as in Example 1 except that the weight per unit area of the solution A printed on the surface of the first paper layer (the basis weight of the final barrier layer) was 0.25 gsm.

Example 2

With regard to the formation of the barrier layer, while molten low-density polyethylene (LDPE, SUMIKATH-ENEL420, manufactured by Sumitomo Chemical Co., Ltd.) was extruded by an extruder on the surface of the first paper layer, the second paper layer was laminated, and the resulting laminate was then solidified by cooling to produce a tobacco product packaging material including a barrier layer having the thickness shown in Table 2.
<Property Evaluation>
After the tobacco product packaging materials were each produced by the methods described above, packing of the tobacco product packaging material was performed (by employing a general packing method including assembling without sealing) so as to package tobacco products using a tobacco packaging machine, and packaging suitability was evaluated. In Table 2, "○" of packaging suitability indicates that permeation of the flavor into the barrier layer and the second paper layer did not occur, and the tension of the product packaging material was maintained (sagging did not occur in the product packaging material), that is, stiffness was sufficient. In contrast, "x" indicates that permeation of the flavor occurred in all the layers constituting the product packaging material, and the tension of the product packaging material was lost (sagging occurred in the product packaging material), that is, stiffness was insufficient. Furthermore, at the times when 3 days, 7 days, and 14 days passed after the packing, the package was opened, and whether or not permeation of the flavor into the second paper layer occurred was checked. In Table 2, "○" of permeation evaluation indicates that permeation did not occur, and "x"

As shown in Table 2, it was found that the tobacco product packaging materials produced in Examples 1 and 2 were excellent in terms of reduction of permeation and packaging suitability.

REFERENCE SIGNS LIST

1 . . . package
2 . . . packaging material
3 . . . outer sheath
203 . . . second paper layer
202 . . . barrier layer
201 . . . first paper layer

The invention claimed is:
1. A tobacco product packaging material, the packaging material being a sheet-packaging material for packaging a tobacco product, the packaging material at least comprising:
  a first paper layer containing a flavoring component,
  a barrier layer having barrier properties against the flavoring component, and
  a second paper layer, wherein
  the barrier layer is disposed so as to be positioned between the first paper layer and the second paper layer, and
  the first paper layer and the barrier layer are in contact with one another.
2. The tobacco product packaging material according to claim 1, further comprising a coat layer serving as an outermost layer on a side where the second paper layer is located when viewed from the barrier layer.
3. The tobacco product packaging material according to claim 1, wherein the flavoring component contains menthol.
4. The tobacco product packaging material according to claim 1, wherein the barrier layer satisfies (Condition 1) below:
  (Condition 1) operations (1) to (4) below using the barrier layer are performed five times, and permeation of ethanol is not visually observed in any of resulting five specimens,
  (1) a specimen in which the barrier layer is disposed on a substrate is prepared,
  (2) the specimen is placed on a flat surface such that the barrier layer faces upward,

(3) three drops of ethanol (purity: 99.5% or more) are dropped from a height of 25 mm onto the barrier layer with a pipette, and (4) ten minutes later, the ethanol adhering to the barrier layer is wiped off with tissue paper.

5. The tobacco product packaging material according to claim 1, wherein (Condition 2) below is satisfied:

(Condition 2) a flavor is applied to the first paper layer such that a basis weight is 10 gsm, and at a time of holding for 14 days, permeation of the flavor is not visually observed on the second paper layer.

6. The tobacco product packaging material according to claim 1, wherein the tobacco product packaging material includes no metal layer.

7. A tobacco product package formed using a tobacco product packaging material, wherein the tobacco product packaging material is the tobacco product packaging material according to claim 1, and the tobacco product package includes a tobacco product accommodated in an internal container formed using the tobacco product packaging material such that the first paper layer is positioned inside.

8. The tobacco product packaging material according to claim 1, wherein the barrier layer includes at least one from among nitrocellulose, methyl cellulose, ethyl cellulose, carboxymethyl cellulose, hydroxyethyl cellulose, hydroxyethylmethyl cellulose, starch, completely saponified polyvinyl alcohol, partially saponified polyvinyl alcohol, ethylene-copolymerized polyvinyl alcohol, polyvinylpyrrolidone, alkyd resin, polyamide resin, polyester resin, styrene-butadiene copolymer, and polyolefin.

9. The tobacco product packaging material according to claim 1, wherein the first paper layer and the second paper layer each comprise a fibrous cellulose-based material in a content of 50% by weight or more.

10. The tobacco product packaging material according to claim 9, wherein the content of the fibrous cellulose-based material in each of the first paper layer and the second paper layer is 70% by weight or more.

11. The tobacco product packaging material according to claim 1, wherein the basis weight of the first paper layer is 25 gsm or more and less than 65 gsm.

12. The tobacco product packaging material according to claim 1, wherein the basis weight of the second paper layer is 20 gsm or more and less than 100 gsm.

13. The tobacco product packaging material according to claim 1, wherein the barrier layer has a basis weight of 0.3 gsm or more and 56 gsm or less.

14. The tobacco product packaging material according to claim 1, wherein the barrier layer has a thickness of 0.2 μm or more and 60 μm or less.

15. The tobacco product packaging material according to claim 14, wherein the barrier layer is a coating layer having a thickness of 0.2 μm or more and 25 μm or less.

16. The tobacco product packaging material according to claim 14, wherein the barrier layer is an extrusion layer having a thickness of 15 μm or more and 60 μm or less.

17. The tobacco product packaging material according to claim 1, wherein the flavoring component has a content in the first paper layer of 2 gsm or more and 20 gsm or less.

18. The tobacco product packaging material according to claim 1, further comprising a glue layer positioned between the barrier layer and the second paper layer.

19. The tobacco product packaging material according to claim 18, wherein the glue layer has a basis weight of 0.3 gsm or more and 4 gsm or less.

20. The tobacco product packaging material according to claim 2, wherein the coat layer has a basis weight of 0.1 gsm or more and 10 gsm or less.

* * * * *